United States Patent Office 3,029,246
Patented Apr. 10, 1962

3,029,246
ω-PHENYL-4-PYRIDINEALKYL ALKOXY-CARBANILATES
Kurt J. Rorig, Glenview, Ill., assignor to G. D. Searle & Co., Chicago, Ill., a corporation of Delaware
No Drawing. Filed Apr. 1, 1960, Ser. No. 19,193
6 Claims. (Cl. 260—295)

This invention relates to ω-phenyl-4-pyridinealkyl alkoxycarbanilates and processes for the manufacture thereof. More particularly, this invention relates to chemical compounds of the formula

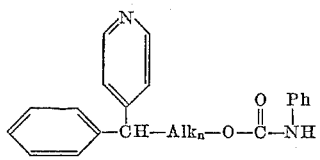

wherein Alk represents an alkylene radical, $n$ represents 0 or 1, and Ph represents an alkoxyphenyl radical.

Among the alkylene radicals represented by Alk in the foregoing formula, methylene, ethylene, propylene, trimethylene, 2-methylpropylene, 3-methyl-1,4-butylene, and homologous bivalent saturated acyclic straight- or branched-chain hydrocarbon groupings of empirical formula $$-C_sH_{2s}-$$

wherein $s$ represents a small positive integer, are preferred. It will be recognized that when $n$ in the generic formula for compounds of this invention represents 0, Alk drops out; and the compounds referred to are depicted by

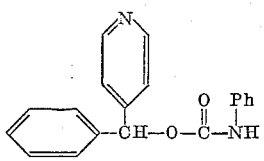

Ph being defined as before.

The alkoxyphenyl radicals represented by Ph in the foregoing formulas comprise either one or a plurality of alkoxy substituents in each instance, lower alkoxy substituents—i.e., those of the formula —O-lower alkyl being of choice. It follows that Ph preferably represents mono- and polyalkoxyphenyl radicals of the formula

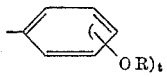

wherein R designates a methyl, ethyl, propyl, isopropyl, butyl, isobutyl, sec-butyl, tert-butyl, pentyl, isopentyl, tert-pentyl, neopentyl, hexyl, isohexyl, heptyl, octyl, or like lower alkyl radical, and $t$ is a positive integer amounting to less than 6.

Equivalent to the basic esters hereof for the purposes of this invention are corresponding acid addition salts of the formula

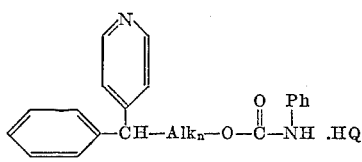

wherein Alk, $n$, and Ph are defined as above and Q represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage.

The compounds of this invention are useful because of their valuable pharmacological properties. Thus, for example, they depress the central nervous system and lower blood pressure.

Manufacture of the subject basic esters proceeds by heating an appropriate ω-phenyl-4-pyridinealkanol

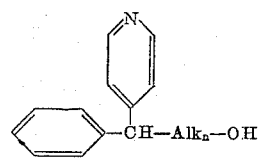

and alkoxyphenyl isocyanate

Ph—NCO together in an anhydrous inert solvent medium, Alk, $n$, and Ph retaining the meanings previously assigned. Conversion of these basic esters to acid addition salts is accomplished by acidification with inorganic or strong organic acids, the anionic portions of which conform to Q as hereinabove set forth.

The following examples described in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

α-Phenyl-4-pyridinemethyl-4-methoxycarbanilate.—A solution of 185 parts of α-phenyl-4-pyridinemethanol and 15 parts of 4-methoxyphenyl isocyanate in 4500 parts of dry benzene is heated at the boiling point under reflux for 4 hours, excess isocyanate being destroyed by introduction of 40 parts of ethanol 5 minutes prior to termination of the heating period. The product is precipitated from the reaction mixture by addition of 3500 parts of petroleum ether boiling in the range 28–38°. The α-phenyl-4-pyridinemethyl-4-methoxycarbanilate thus obtained, collected on a filter and recrystallized from a mixture of benzene and cyclohexane, melts at approximately 123–124°. It has the formula

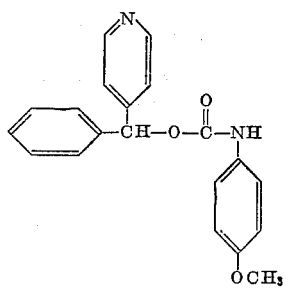

Example 2

A. α-Phenyl-4-pyridinemethyl 3,4,5-trimethoxycarbanilate.—A solution of 185 parts of a α-phenyl-4-pyridinemethanol and 210 parts of 3,4,5-trimethoxyphenyl isocyanate in 4500 parts of dry benzene is heated at the boiling point under reflux for 6½ hours. The benzene is then removed by distillation, leaving α-phenyl-4-pyridinemethyl 3,4,5-trimethoxycarbanilate as the residue, a yellow oil. The product has the formula

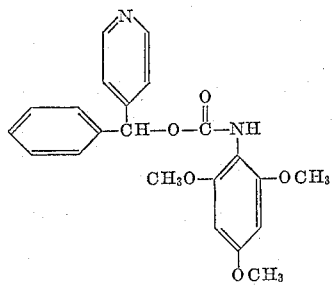

B. *α-Phenyl-4-pyridinemethyl 3,4,5-trimethoxycarbanilate hydrochloride.*—A solution of 24 parts of the basic ester of the foregoing Part A of this example in 200 parts of warm absolute ethanol is made barely acid with a solution of hydrogen chloride in absolute 2-propanol. The resultant solution is diluted with anhydrous ether to the point of incipient turbidity. Upon standing, the desired α-phenyl-4-pyridinemethyl 3,4,5-trimethoxycarbanilate hydrochloride precipitates as an ivory-colored crystalline solid which melts at 219–221° with decomposition.

Example 3

*β-Phenyl-4-pyridineethyl 2-ethoxycarbanilate.*—Substitution of 200 parts of β-phenyl-4-pyridineethanol and 165 parts of 2-ethoxyphenyl isocyanate for the α-phenyl-4-pyridinemethanol and 4-methoxyphenyl isocyanate, respectively, called for in Example 1 affords, by the procedure there detailed, β-phenyl-4-pyridineethyl 2-ethoxycarbanilate of the formula

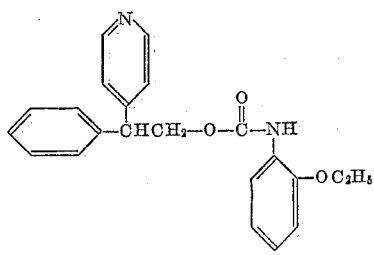

Example 4

*γ-Phenyl-4-pyridinepropyl 4-methoxycarbanilate.*—Substitution of 215 parts of γ-phenyl-4-pyridinepropanol for the α-phenyl-4-pyridinemethanol called for in Example 1 affords, by the procedure there detailed, γ-phenyl-4-pyridinepropyl 4-methoxycarbanilate, which, recrystallized from a mixture of benzene and petroleum ether (boiling range, 28–38°), melts at approximately 131.5–132.5°. The product has the formula

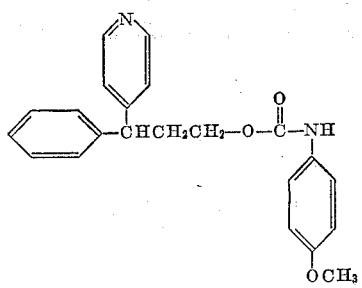

What is claimed is:
1. A compound of the formula

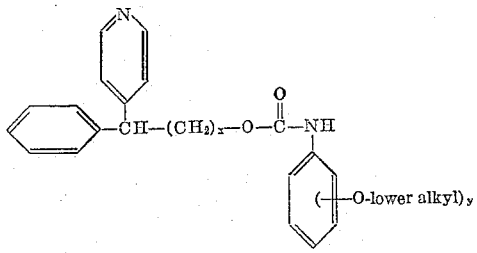

wherein $x$ is selected from the group consisting of 0 and positive integers less than 3, and $y$ is a positive integer less than 4.

2. A compound of the formula

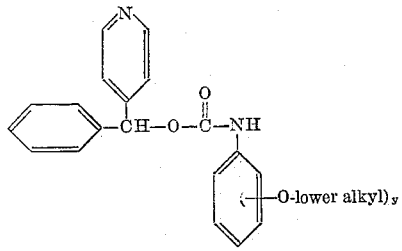

wherein $y$ is a positive integer less than 4.

3. α-Phenyl-4-pyridinemethyl 4-methoxycarbanilate.
4. α-Phenyl-4-pyridinemethyl 3,4,5-trimethoxycarbanilate.
5. A compound of the formula

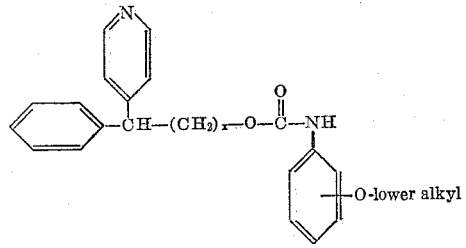

wherein $x$ is a positive integer less than 3.

6. γ-Phenyl-4-pyridinepropyl 4-methoxycarbanilate.

References Cited in the file of this patent

Ashworth et al.: J. Chem. Soc., vol. 1939, pages 809, 12 (1939).